US008141270B2

(12) United States Patent
Gera, Jr.

(10) Patent No.: US 8,141,270 B2
(45) Date of Patent: Mar. 27, 2012

(54) GAS FLOW RATE DETERMINATION METHOD AND APPARATUS AND GRANULAR MATERIAL DRYER AND METHOD FOR CONTROL THEREOF

(75) Inventor: Michael E. Gera, Jr., Aston, PA (US)

(73) Assignee: Maguire Products, Inc., Aston, PA (US)

(*) Notice: Subject to any disclaimer, the term of this patent is extended or adjusted under 35 U.S.C. 154(b) by 399 days.

(21) Appl. No.: 12/540,541

(22) Filed: Aug. 13, 2009

(65) Prior Publication Data

US 2011/0035959 A1    Feb. 17, 2011

(51) Int. Cl.
*F26B 3/06* (2006.01)

(52) U.S. Cl. .................. 34/413; 34/493; 34/90; 34/218; 73/204.16; 236/49.3; 703/47

(58) Field of Classification Search .................. 34/380, 34/381, 413, 296, 493, 90, 210, 218; 73/204.16; 236/49.3; 702/47
See application file for complete search history.

(56) References Cited

U.S. PATENT DOCUMENTS

| 512,673 | A | 1/1894 | Mason |
| 753,597 | A | 3/1904 | Long |
| 960,857 | A | 6/1910 | Eggert |
| 1,520,017 | A | 12/1924 | Denton |
| 1,620,289 | A | 3/1927 | Ridley |
| 1,625,451 | A | 4/1927 | Brown |
| 2,161,190 | A | 6/1939 | Paull |
| 2,550,240 | A | 4/1951 | Geiger et al. |
| 2,569,085 | A | 9/1951 | David et al |
| 2,587,338 | A | 2/1952 | Lee et al. |
| 3,111,115 | A | 11/1963 | Best |
| 3,113,032 | A | 12/1963 | Wayne |
| 3,115,276 | A | 12/1963 | Johanningmeier |
| 3,138,117 | A | 6/1964 | Dorey |

(Continued)

FOREIGN PATENT DOCUMENTS

AU            417596          6/1971

(Continued)

OTHER PUBLICATIONS

Thirty-nine page brochure entitled "Maguire Low Pressure Dryer: Sep. 7, 2000: Installation Operation Maintenance", 2000.

(Continued)

*Primary Examiner* — Stephen M. Gravini
(74) *Attorney, Agent, or Firm* — Charles N. Quinn, Esq.; Fox Rothschild LLP

(57) ABSTRACT

Methods and apparatus for determining flow rate of air or other gas through a conduit independently of conduit cross sectional area include providing apparatus for and measuring temperature of the air or other gas at a first position along the conduit; providing apparatus for and heating the air or other gas in the conduit of the location downstream from the first position by application of a known power level to the air or other gas in the conduit; providing apparatus for and measuring air or other gas temperature at a second position downstream of the heating position along the conduit; providing apparatus for and subtracting air or other gas temperature at the second position from air or other gas temperature at the first position to obtain a temperature difference and thereafter providing apparatus for and dividing power applied to heat the air or other gas by the product of the temperature difference and the specific heat of the air or other gas.

24 Claims, 4 Drawing Sheets

U.S. PATENT DOCUMENTS

| | | | |
|---|---|---|---|
| 3,144,310 A | 8/1964 | Glatt et al. | |
| 3,209,898 A | 10/1965 | Beebe et al. | |
| 3,348,848 A | 10/1967 | Lucking et al. | |
| 3,470,994 A | 10/1969 | Schnell et al. | |
| 3,597,850 A | 8/1971 | Jenkins | |
| 3,628,508 A * | 12/1971 | Kummel | 122/7 R |
| 3,649,202 A * | 3/1972 | Bajek et al. | 422/62 |
| 3,698,098 A | 10/1972 | Ramsay | |
| 3,834,038 A | 9/1974 | Janda | |
| 3,959,636 A | 5/1976 | Johnson et al. | |
| 3,969,314 A | 7/1976 | Grigull | |
| 3,985,262 A | 10/1976 | Nauta | |
| 4,026,442 A | 5/1977 | Orton | |
| 4,108,334 A | 8/1978 | Moller | |
| 4,127,947 A | 12/1978 | Webb et al. | |
| 4,148,100 A | 4/1979 | Moller | |
| 4,219,136 A | 8/1980 | Williams et al. | |
| 4,294,020 A | 10/1981 | Evans | |
| 4,322,970 A * | 4/1982 | Peter | 73/114.34 |
| 4,354,622 A | 10/1982 | Wood | |
| 4,357,830 A * | 11/1982 | Kohama et al. | 73/204.16 |
| 4,364,666 A | 12/1982 | Keyes | |
| 4,394,941 A | 7/1983 | Recine | |
| 4,399,697 A * | 8/1983 | Kohama et al. | 73/204.16 |
| 4,402,436 A | 9/1983 | Hellgren | |
| 4,413,426 A | 11/1983 | Graff | |
| 4,414,847 A * | 11/1983 | Kohama et al. | 73/204.25 |
| 4,454,943 A | 6/1984 | Moller | |
| 4,475,672 A | 10/1984 | Whitehead | |
| 4,498,783 A | 2/1985 | Rudolph | |
| 4,505,407 A | 3/1985 | Johnson | |
| 4,510,106 A | 4/1985 | Hirsch | |
| 4,525,071 A | 6/1985 | Horowitz et al. | |
| 4,531,308 A | 7/1985 | Neilson et al. | |
| 4,581,704 A | 4/1986 | Mitsukawa | |
| 4,603,489 A | 8/1986 | Goldberg | |
| 4,619,379 A | 10/1986 | Biehl | |
| 4,705,083 A | 11/1987 | Rossetti | |
| 4,732,318 A * | 3/1988 | Osheroff | 236/49.3 |
| 4,756,348 A | 7/1988 | Moller | |
| 4,793,711 A | 12/1988 | Ohlson | |
| 4,830,508 A | 5/1989 | Higuchi et al. | |
| 4,848,534 A | 7/1989 | Sandwall | |
| 4,850,703 A | 7/1989 | Hanaoka et al. | |
| 4,938,061 A * | 7/1990 | Carp | 73/204.19 |
| 4,952,856 A * | 8/1990 | Schmitz | 318/471 |
| 5,064,328 A | 11/1991 | Raker | |
| 5,110,521 A | 5/1992 | Moller | |
| 5,116,547 A | 5/1992 | Tsukahara et al. | |
| 5,132,897 A | 7/1992 | Allenberg | |
| 5,143,166 A | 9/1992 | Hough | |
| 5,148,943 A | 9/1992 | Moller | |
| 5,172,489 A | 12/1992 | Moller | |
| 5,225,210 A | 7/1993 | Shimoda | |
| 5,252,008 A | 10/1993 | May, III et al. | |
| 5,261,743 A | 11/1993 | Moller | |
| 5,285,930 A | 2/1994 | Nielsen | |
| 5,293,697 A | 3/1994 | Kawakami | |
| 5,340,949 A | 8/1994 | Fujimura et al. | |
| 5,341,961 A | 8/1994 | Hausam | |
| 5,423,455 A | 6/1995 | Ricciardi et al. | |
| 5,426,415 A * | 6/1995 | Prachar et al. | 340/576 |
| 5,433,020 A | 7/1995 | Leech | |
| 5,501,143 A | 3/1996 | Thom, Jr. | |
| 5,513,445 A | 5/1996 | Farrag | |
| 5,594,035 A | 1/1997 | Walsh | |
| 5,651,401 A | 7/1997 | Cados | |
| 5,732,478 A | 3/1998 | Chapman | |
| 5,767,453 A | 6/1998 | Wakou et al. | |
| 5,767,455 A | 6/1998 | Mosher | |
| 5,780,779 A | 7/1998 | Kitamura et al. | |
| 5,807,422 A | 9/1998 | Grgich et al. | |
| 5,843,513 A | 12/1998 | Wilke et al. | |
| 6,079,122 A | 6/2000 | Rajkovich | |
| 6,151,795 A | 11/2000 | Hoffman et al. | |
| 6,154,980 A | 12/2000 | Maguire | |
| 6,315,902 B1 | 11/2001 | Collasius et al. | |
| 6,357,294 B1 * | 3/2002 | Nakada | 73/204.26 |
| 6,449,875 B1 | 9/2002 | Becker et al. | |
| 7,234,247 B2 | 6/2007 | Maguire | |
| 2002/0024162 A1 | 2/2002 | Maguire | |
| 2002/0092525 A1 * | 7/2002 | Rump et al. | 128/205.23 |
| 2005/0092675 A1 * | 5/2005 | Nakahara et al. | 210/500.21 |
| 2007/0234702 A1 * | 10/2007 | Hagen et al. | 60/39.01 |
| 2008/0237361 A1 * | 10/2008 | Wang | 236/49.3 |
| 2011/0035959 A1 * | 2/2011 | Gera, Jr. | 34/493 |
| 2011/0106475 A1 * | 5/2011 | Wigen | 702/99 |

FOREIGN PATENT DOCUMENTS

| | | | |
|---|---|---|---|
| CA | 1100402 | | 5/1981 |
| CH | 688217 | | 6/1997 |
| DE | 318127 | | 3/1914 |
| DE | 421770 | | 11/1925 |
| DE | 623000 | | 6/1937 |
| DE | 3541532 | | 5/1986 |
| DE | 3923241 | | 1/1991 |
| DE | 4300060 | | 7/1994 |
| DE | 4300595 | | 7/1994 |
| DE | 19740338 A1 * | | 3/1999 |
| DE | 19842778 A1 * | | 3/2000 |
| EP | 0132482 | | 2/1985 |
| EP | 0318170 | | 5/1989 |
| EP | 0466362 | | 1/1992 |
| EP | 0507689 | | 10/1992 |
| EP | 0587085 | | 3/1994 |
| EP | 0743149 | | 11/1996 |
| EP | 0997695 | | 5/2000 |
| EP | 1004856 A2 * | | 5/2000 |
| EP | 1288600 | | 3/2003 |
| FR | 802618 | | 9/1936 |
| FR | 2109840 | | 5/1972 |
| FR | 2235775 | | 1/1975 |
| FR | 2517087 | | 5/1983 |
| FR | 2695988 | | 3/1994 |
| GB | 479090 | | 1/1938 |
| GB | 671085 | | 4/1952 |
| GB | 849613 | | 9/1960 |
| GB | 2081687 | | 2/1982 |
| JP | 58133308 A * | | 8/1983 |
| JP | 58155423 A * | | 9/1983 |
| JP | 59187081 A * | | 10/1984 |
| JP | 59190623 A * | | 10/1984 |
| JP | 59204731 A * | | 11/1984 |
| JP | 62083622 A * | | 4/1987 |
| JP | 01286806 | | 6/1987 |
| JP | 01235604 | | 9/1989 |
| JP | 02077619 A * | | 3/1990 |
| JP | 02293501 A * | | 12/1990 |
| JP | 03020619 A * | | 1/1991 |
| JP | 03172716 A * | | 7/1991 |
| JP | 4201522 | | 7/1992 |
| JP | 04278423 A * | | 10/1992 |
| JP | 04320946 A * | | 11/1992 |
| JP | 05142006 A * | | 6/1993 |
| JP | 06080015 A * | | 3/1994 |
| JP | 6114834 | | 4/1994 |
| JP | 11064059 A * | | 3/1999 |
| JP | 2000257809 A * | | 9/2000 |
| JP | 2002174541 A * | | 6/2002 |
| WO | WO 99/37964 | | 7/1999 |
| WO | WO 01/49471 | | 7/2001 |

OTHER PUBLICATIONS

Two-sided color brochure entitled "NovaDrierä N Series Dryer" published by Novatec Inc., undated.

International Search Report for PCT/US98/19464 (WO 99/15324).

International Search Report for PCT/US02/19294.

Two page two-sided color brochure entitled "LPD Series Dryers: New Directions in drying technology" of Maguire Products, Inc., Jun. 6, 2000.

One page two-sided color brochure entitled "Drying Systems: WGR Gas Dryer Retrofit" of AEC Whitlock, 1997.

Two page two-sided color brochure entitled "Drying Systems: Mass Flow™ Series Drying Hoppers" of AEC Whitlock, 1998.

Four page color brochure entitled "Speedryer Thermodynamic Hopper Dryer" of Canam Manufactured Products Inc., Dec. 10, 2001.

Two page two-sided color brochure entitled "WDMR Series Compact Dryers" of AEC Whitlock, 1998.

Two page two-sided color reprint entitled "10 most frequently asked questions about Dryers" by Joseph Dziediz, AEC/Whitlock, from Plastics Technology, Jan. 1998.

Two page two-sided color brochure entitled "Drying Systems: WD Series High Capacity Dehumidifying Dryers" of AEC Whitlock, 1997.

Three page two-sided color brochure entitled "Portable Drying and Conveying Systems: Nomad™ Series Portable Dryers", AEC Whitlock, 1998.

Two page two-sided color brochure entitled "Drying Systems: WD Series Dehumidifying Dryers" of AEC Whitlock, 1997.

Five page two-sided color brochure entitled "AEC Auxiliaries As Primary", AEC, Inc., 1999.

Two page two-sided color brochure entitled "LPD Vacuum Dryers" of Maguire Products, Inc. Jun. 6, 2000.

19 page document entitled "Model MLS—Clear Vu Eight Component Vacuum Loading System: Operation Manual" of Maguire Products, Inc. dated May 4, 1999.

One page two-sided color brochure entitled "Maguire Clear-Vu™ Loading System" of Maguire Products, Inc.

One page color advertisement entitled "this little vacuum dryer can do in 40 minutes what it takes your desiccant dryer to do in 4 hours.", Plastic News dated Nov. 19, 2001.

One page color article entitled "Dryer Competition Heats Up With New Designs", Modern Plastics, Jul. 2001, p. 68.

One page advertisement of Frigomeccanica Industriale, Modern Plastics, Jul. 2001, p. 70.

16 page Low Pressure Dryer Technical Information Specifications Features of Maguire Products, Inc. dated Nov. 29, 2000.

One page article entitled "New Dryer Technologies at NPE Aren't Just Hot Air", Plastics Technology, Aug. 2000, p. 19.

One page article entitled "Tech Preview", Automatic Plastics, Aug. 2000, p. 66.

One page article entitled "Maguire expands Low Pressure Dryer commercialization" from www.specialchem.com dated Mar. 30, 2001.

One page article entitled "Smaller Resin Dryer", Plastics Engineering, Aug. 2001, p. 28.

Five page brochure entitled LPD™ Series Dryers of Maguire Products, Inc. dated Jan. 29, 2001.

Two page press released entitled "Maguire® LPD™ 30, Smaller Model of Breakthrough Resin Dryer, Will Make World Debut at K 2001 Show" of Maguire Products, Inc. dated Jun. 29, 2001.

Three page press release entitled "In Commercial Use by Wide Range of Plastic Processors, Maguire® LPD™ Resin Dryer Yields Big Savings in Energy Costs" of Maguire Products, Inc. dated May 14, 2001.

Two page press release entitled "Maguire Obtains Patent on Fundamentally New Resin Dryer and Steps Up Program for Worldwide Commercialization" of Maguire Products, Inc. dated Dec. 18, 2000.

Six page press release entitled "Fast, Low-Cost Process Transforms Resin Drying, Promising Dramatic Advance in Industry Productivity and Quality" of Maguire Products, Inc. dated Jun. 20, 2000.

Two page press release entitled "New-Concept Resin Dryer Enables Custom Molder to Eliminate Reject Parts—and Once More Enjoy Sunday Evenings" of Maguire Products, Inc. dated Jun. 20, 2000.

One page color article entitled "Maguire LPD unit nets positive marks", Plastic News, Oct. 3, 2001, p. 3.

International Search Report dated Sep. 29, 2005 in connection with International Patent Application No. PCT/US2005/021851.

Five page Written Opinion of the International Searching Authority dated Sep. 29, 2005 in connection with International Patent Application No. PCT/US2005/021851.

Eight page European Search Report dated Sep. 23, 2005 in connection with European Patent Application No. EP05076911.

* cited by examiner

GAS FLOW RATE DETERMINATION METHOD AND APPARATUS AND GRANULAR MATERIAL DRYER AND METHOD FOR CONTROL THEREOF

BACKGROUND OF THE INVENTION

1. Field of the Invention

This invention relates generally to gas flow and determination of gas flow rates. This invention relates more specifically to dryers and to gas flow rate determination for such dryers used to dry granular resin and other granular and powdery materials, and particularly relates to air blowers and air flow rate measuring devices used with such dryers.

2. Description of the Prior Art

Dryers for granular resin material and other powdery materials fall into two categories: vacuum dryers and desiccant-based dryers. This invention pertains principally to desiccant-based dryers, but also has applicability to vacuum dryers. Exemplary desiccant-based dryers are disclosed in U.S. Pat. Nos. 5,487,225 and 7,007,402; exemplary vacuum dyers are disclosed in U.S. Pat. Nos. 6,154,980 and 7,234,247.

Dryers, specifically desiccant-based dryers, use blowers to move air into hoppers filled with granular material to be dried by the dryer. Dryer users, knowing the rated cubic feet per minute of air flow capability of the dryer blower, often want to know the cubic feet per minute of air the blower is actually moving. The number of cubic feet per minute of air moved by the blower reveals the condition of the air filter in the system, and may reveal or affect other parameters of interest.

As a result, dryer users many times install devices for measuring air flow in cubic feet per minute with these devices positioned in conduit carrying an air stream into or out of the dryer hopper. These known air flow rate measuring devices are notoriously inaccurate and are also sensitive to heat. The air stream may still be warm if it has been used to dry granular resin or other granular or powdery material of interest by heating that material to drive moisture from the material. As a result, known devices used to measure flow rate of air passing through an air duct may be essentially useless if the temperature of the air flowing therethrough is excessive.

From the foregoing, it is apparent that there is a need for more accurate, and desirably less expensive, air flow rate measuring technology.

SUMMARY OF THE INVENTION

This invention relates to the indirect determination of air flow and other gas flow rates, preferably measured in cubic feet of air flow per minute. The invention makes this determination using (i) a known temperature rise occurring as the air or other gas flows across a heater in an air stream and (ii) the power consumed by the heater in effectuating that temperature rise. This invention further relates to dryers, for granular resin and other granular and powdery materials using heated air or other gas to heat and thereby dry the granular resin or other material, using air flow measurement devices for monitoring and/or controlling dryer operation.

In determining the power load of a heater located in an air stream conduit, power to the heater is desirably controlled so that one knows the actual power in watts being used by the heater. Inlet temperature and outlet temperature, namely temperatures upstream and downstream of the heater in the conduit, are used to determine the temperature increase. Knowing the temperature at points upstream and downstream of the heater, and the power used to raise that temperature from the inlet or upstream temperature to the outlet or downstream temperature, and knowing the specific heat of air, the invention determines cubic feet per minute of air flow in a conduit of interest.

In one of the method aspects of the invention, the method proceeds to determine air flow rate by providing a conduit for air flow therethrough, where the rate of air flow is to be determined independently of the diameter or cross-sectional area of the conduit. Air temperature is measured at a first position along the conduit. Air in the conduit is heated, at a location downstream from the first position, by application of a known power level to an air heater. Air temperature is measured at a second position along the conduit that is downstream of the heater. Air temperature at the second position is subtracted from air temperature at the first position to obtain a temperature difference. The power used by the heater to heat the air is divided by the product of the temperature difference and the specific heat of air to reveal air flow rate through the duct.

If an electrical resistance heater is used to perform the heating function, essentially all of the power consumed by the electrical resistance heater is transferred to the air. Power consumed by an electrical resistance heater is easily measured.

Desirably, the first temperature measurement position is at the conduit inlet; however, with appropriate device configuring, the first temperature measurement position may be upstream of the conduit inlet. Similarly, the second temperature measurement position is desirably at the conduit outlet; with appropriate device configuring, the second temperature measurement position may be downstream of the conduit outlet. Heating is desirably performed using an electrical resistance heater; however, the invention is not limited to using an electrical resistance heater to perform the heating function.

In another one of its aspects, this invention provides a method for drying granular resin and other granular and powdery materials, where the method includes introducing the granular material to be dried into a closed hopper having an air inlet receiving heated air via an inlet conduit. The inlet conduit preferably has at least one preferably electrical resistance heater positioned to heat air passing through the inlet conduit into the hopper, and preferably further includes air temperature sensors positioned in the air stream upstream and downstream of the heater. The hopper also has an outlet for air to escape from the hopper after having contacted the material in the hopper for heat transfer from the air into the material. The method further embraces determining heated air flow rate into the hopper by measuring temperature of the air at a first position along the inlet conduit, heating the air in the inlet conduit at a location downstream from the first position by application of a known level of power via a preferably electrical resistance heater used to heat the air to a desired temperature, and measuring air temperature at a second position along the inlet conduit that is downstream of the electrical resistance heater. The invention proceeds to determine heated air flow rate into the hopper by subtracting air temperature at the second position from air temperature at the first position to obtain a temperature difference, and thereafter dividing the power applied to the preferably electrical resistance heater to heat the air by the product of the temperature difference and the specific heat of air to provide air flow rate into the hopper. The method further proceeds to regulate air flow rate into the hopper according to the desired and/or actual temperature of material in the hopper to be dried and the air temperature as measured at the second position.

In yet another one of its aspects, the invention provides apparatus for determining air flow rate in a conduit independently of the cross-sectional area of the conduit, where the apparatus includes a first temperature sensor for measuring temperature of the air at a first position along the conduit, an electrical resistance heater for heating air in the conduit downstream of the first temperature sensor with a known amount of power, a second temperature sensor for measuring temperature of the air downstream of the heater, and a microprocessor for mathematically dividing the power applied to heat the air by the product of the temperature difference and the specific heat of air.

In still yet another one if its aspects, this invention provides apparatus for drying granular and powdery material where the apparatus includes a hopper containing the granular or powdery material to be dried, an air filter, an air dryer, a blower, and a conduit serially connecting the hopper, the filter, the air dryer and the blower for air flow thereamong, and at least one air flow rate measuring device positioned in one section of the conduit for measuring the rate of air flow through the conduit section to which the device is connected. Each air flow rate measuring device includes a first temperature sensor for measuring temperature of the air at a first position along the conduit, a heater for heating air in the conduit downstream of the first temperature sensor with a known amount of power, and a second temperature sensor for measuring temperature of the air downstream of the heater. In this aspect of the invention, the apparatus further includes one or more microprocessors, receiving inputs from the temperature sensors and the power furnished to the heaters, for dividing the power applied to each heater employed to heat the air by the product of the temperature difference as measured by the temperature sensors associated with the heater and the specific heat of air. The apparatus optionally provides visually discernable preferably numerical signals indicative of the rate of air flow through the conduit sections associated with given heaters.

In yet another one of its aspects, this invention provides a method and apparatus for controlling the drying of granular resin and other granular and powdery materials in a generally closed hopper having an air inlet receiving heated air from an inlet conduit, with at least one heater, which is preferably an electrical resistance heater, positioned to heat air passing through the inlet conduit into the hopper, with air temperature sensors positioned in the inlet conduit air stream upstream and downstream of the heater, and with an outlet for air to escape from the hopper after having contacted the material therein for heat transfer from the air to the material. In this aspect of the invention, heated air flow rate into the hopper is determined by measuring temperature of the air at a first position along the inlet conduit, heating the air in the inlet conduit at a location downstream from the first temperature measuring position by application of known power to the heater to heat the air, and measuring air temperature at a second position along the inlet conduit that is downstream of the heater. Air temperature at the second position is subtracted from air temperature at the first position to obtain a temperature difference. The power applied to the heater to heat the air is divided by the product of the temperature difference and the specific heat of air to provide air flow rate into the hopper. Air flow rate into the hopper thereafter is regulated according to a desired maximum temperature of material to be dried in the hopper and the inlet air temperature as measured at the second position.

The invention has applicability not only to measuring air flow rates, but also to measuring flow rates of any gas that is non-flammable at workable temperature levels.

DESCRIPTION OF THE PREFERRED
EMBODIMENTS AND BEST MODE KNOWN
FOR PRACTICE OF THE INVENTION

Figure 1:
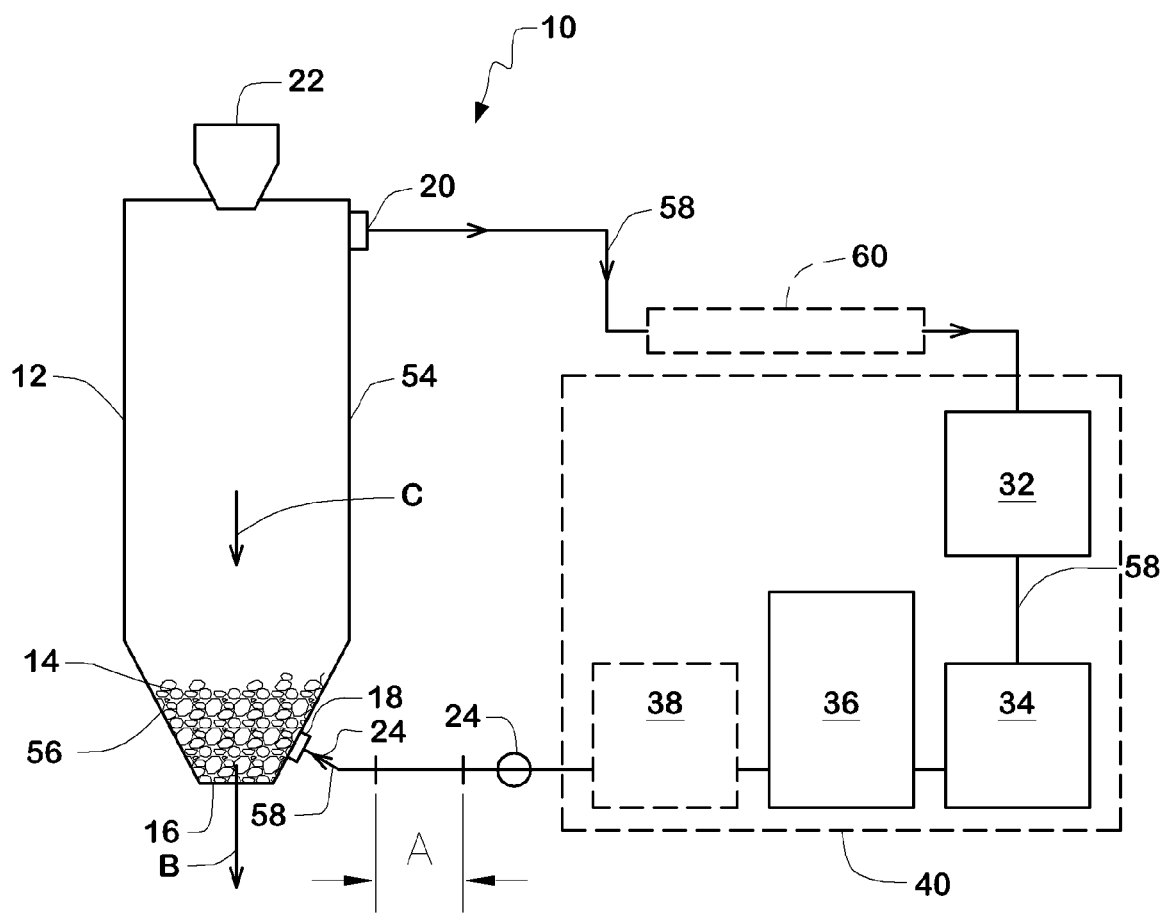
FIG. 1 is a schematic representation of a desiccant-based granular material dryer embodying aspects of the invention.

Referring generally to the drawings, and specifically to FIG. 1, a desiccant-based dryer for drying granular or powdery material, preferably granular resin pellets, is designated generally 10, and includes a hopper 12. The dryer may be particularly adapted for drying a particular type of granular material, such as polyethylene terephthalate or "PET". Hopper 12 is shown in schematic form with granular material 14 depicted residing in hopper 12 and being dried by operation of dryer 10. Hopper 12 is generally cylindrically configured as shown, with the cylinder being oriented about a vertical axis and having an adjoining conical lower section. The cylindrical section of hopper 12 is designated generally 54, while the conical lower section of hopper 12 is designated generally 56. The lower portion of conical section 56 is truncated to provide a granular material outlet 16 from hopper 12. Hopper 12 further includes a heated air inlet 18, shown in schematic form only, via which a conduit designated generally 58 provides hot air to dry granular material 14 within hopper 12, as known generally in the art.

Hopper 12 further includes an air outlet 20 located at the upper portion of hopper 12 close to the upper extremity of cylindrical section 54. As a result, hot air introduced into hopper 12 via heated air inlet 18 flows generally upwardly through granular material 14 resident within hopper 12 and out of hopper 12 via air outlet 20. As the hot air passes upwardly through and around granular material 14, the granular material 14 is heated; moisture consequently evaporates therefrom. Granular material that has been suitably dried as a result of a heating is released downwardly from hopper 12 via material outlet 16; as dried material exits hopper 12 via outlet 16 remaining granular material as it is dried within hopper 12 travels generally downwardly as indicated by arrow "C" shown within cylindrical section 54 of hopper 12. Downward discharge of heated, now dry granular material from hopper 12 is indicated schematically by arrow "B".

Granular material to be dried is preferably supplied to the upper section of cylindrical section 54 of hopper 12 via a material loader 22. Hot air is supplied to heated air inlet 18 of hopper 12 via a hot air conduit section 24, which is one section of conduit 58. Conduit 58 may be used to serially connect at least hopper 12, an air filter 32, a blower 34, and a preferable desiccant-based air dryer 36, all as described below.

Dryer 10 may further include an optional housing 40, within which may be housed air filter 32, blower 34 and air dryer 36, as well as an optional auxiliary air heater 38. The optional nature of housing 40 and auxiliary heater 38 is indicated by the dotted lines depicting these components.

Conduit 58 may further pass through an optional heat exchanger 60, so that residual heat remaining in air withdrawn from hopper 12, after the air has served to heat and thereby dry granular material 14, may be recovered and used for various purposes, thereby increasing efficiency of dryer 10.

Figure 2:
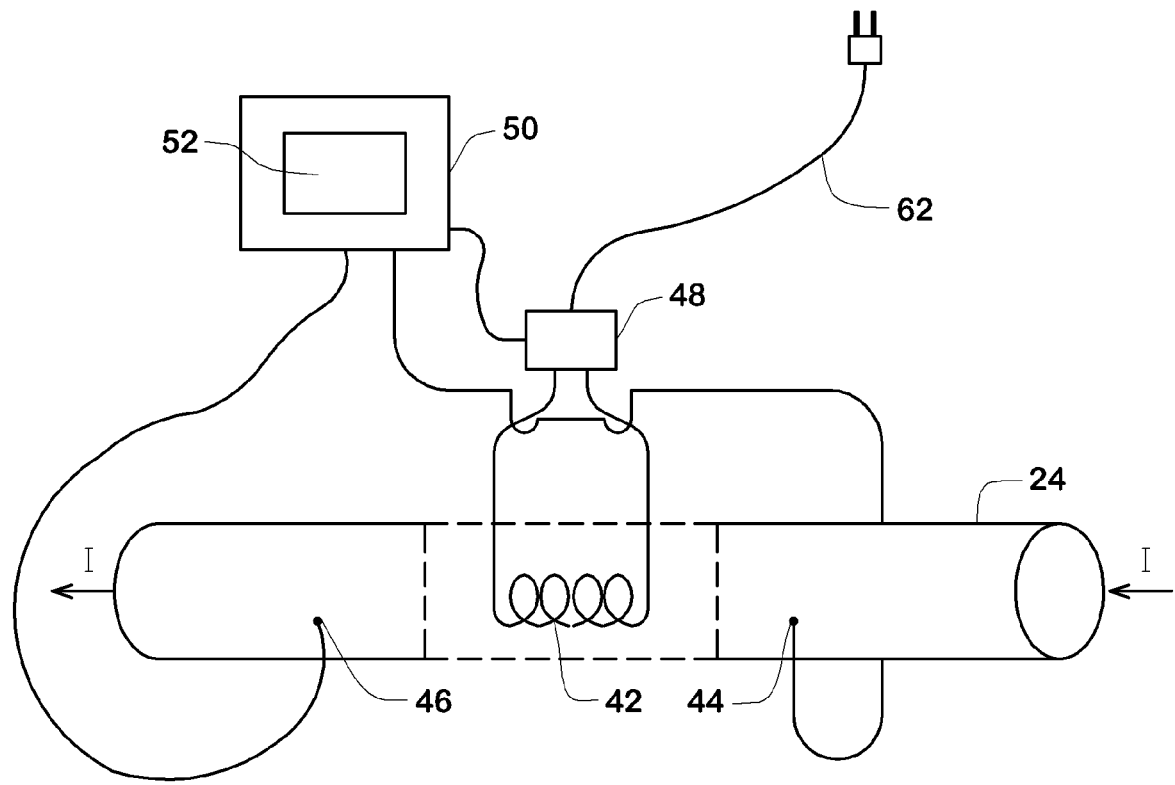
FIG. 2 is an enlarged representation of the portion of a conduit illustrated schematically in FIG. 1 denoted by dimensional style arrow "A", and other components.

FIG. 2 illustrates a section of hot air conduit section 24 in schematic form, which section is designated by arrow "A" in FIG. 1. A portion of hot air conduit 24 has been shown in dotted lines to schematically depict the interior of hot air conduit 24. Mounted within hot air conduit 24 is an electrical resistance heater designated generally 42. Air flow through hot air conduit 24 is in the direction indicated by arrows "I". Preferably mounted within conduit 24, upstream of electrical resistance heater 42, is a first temperature sensor 44, while preferably mounted within hot air conduit 24, downstream of electrical resistance heater 42, is a second temperature sensor 46.

A transformer 48 is depicted schematically and supplies power at appropriate voltage and current levels to electrical resistance heater 42. Application of power energizes heater 42, causing heater 42 to rise in temperature and provide a required amount of heat to air passing through hot air conduit 24 in the direction indicated by arrows "I". A line cord 62 is depicted coming out of transformer 48 to provide electric utility power to transformer 48.

Transformer 48 is connected via one or more electrical lines, not numbered, to a microprocessor 50, which also receives, as input, signals from first and second temperature sensors 44, 46 via suitable wiring shown in FIG. 2. This wiring has not been numbered in order to enhance drawing clarity. Microprocessor 50 desirably includes or is at least connected to video screen 52 on which the flow rate of air in cubic feet per minute through hot air conduit 24 section may be displayed, once that number has been computed by microprocessor 50 using data received from transformer 48 and from first and second temperature sensors 44, 46.

As illustrated in FIG. 1, hot air conduit section 24 is a portion of conduit 58, which serves to interconnect hopper 12, filter 32, blower 34, and air dryer 36, as well as optional heat exchanger 60 and optional auxiliary heater 38, if either or both of those optional components are present in dryer 10.

While the apparatus for determining air flow rate in a conduit, as depicted in FIG. 2 in schematic form, has been illustrated as being present in hot air conduit 24, with electrical resistance heater 42 supplying the required heat for the air input to hopper 12, the apparatus for determining air flow rate in a conduit as illustrated in FIG. 2 could be used in other sections of conduit 58. Indeed, multiple apparatus for determining air flow rate in a conduit may be used for a single dryer 10, depending on the wishes of the dryer operator for data regarding air flow through different sections of conduit 58, all forming a part of dryer 10.

In one exemplary practice, air flow rate was determined using an electrical resistance heater having a measured resistance of 11.64 ohms, providing the heater with a measured power output of 39,554 watts. The heater was programmed to be "on" seventy percent (70%) of each second, namely seventy percent (70%) of the time, while air flow rate was being determined. As a result, the heater provided 27,688 watts of power in the form of heat.

Using the Equation:

$$Q=(m)(c)(\Delta T)$$

airflow was computed to be 324 standard cubic feet per minute. Q was the amount of heating power provided by the heater, namely 27,688 watts. 0.24 Btu/lb-° F. was used for the specific heat of air. 0.075 lb/ft.$^3$ was used for the density of air. The temperature difference was 270° as a result of measuring 80° Fahrenheit upstream of the heater and 350° Fahrenheit downstream of the heater. When these parameters were used and the equation solved for "m" as air flow rate, the air flow rate was 324 standard cubic feet per minute.

In another exemplary practice, air flow rate was determined using an electrical resistance heater having a measured resistance of 11.65 ohms, providing the heater with a measured power output of 39,554 watts, which converts to 2,250 Btu per minute. The heater was operated such that the heater was "on" 100% of the time. The same equation as noted above was used where "Q" was 2,250 Btu/minute. 0.24 Btu/lb-° F. was used for the specific heat of air. 0.075 lb/ft.$^3$ was used for the density of air. The temperature differential was 255° F. as a result of measuring 80° F. upstream of the heater, and 335° F. downstream of the heater. When these parameters were used and the equation solved for "m" as the flow rate, the air flow rate was 490 standard cubic feet/minute.

Figure 3:
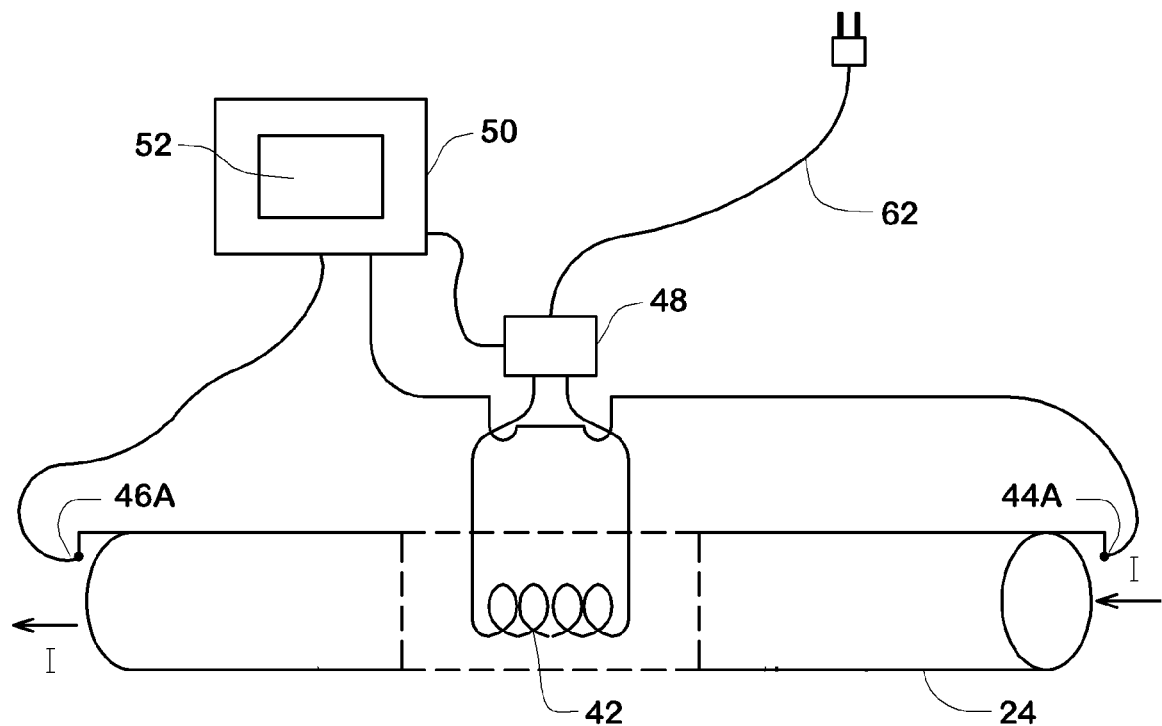
FIG. 3 illustrates a second embodiment, similar to that shown in FIG. 2, where the temperature sensors have been placed at an alternate position, immediately outside the conduit, as described below.

FIG. 3 illustrates a section of hot air conduit section 24 in schematic form, similar to the form illustrated in FIG. 2, with the section again being taken as designated by arrow "A" in FIG. 1. The apparatus illustrated in FIG. 3 is identical to the apparatus illustrated in FIG. 2 other than for the placement of first and second temperature sensors 44A and 46A. In FIG. 3, temperature sensors 44A and 46A have been depicted upstream of the inlet to hot air conduit section 24 and downstream from the outlet of hot air conduit section 24. Temperature sensors 44A and 46A may be so positioned outside of hot air conduit section 24 so long as they are positioned such that they accurately measure the temperature of the air entering and exiting hot air conduit section 24. First and second temperature sensors 44A and 46A may be somewhat removed from the inlet and outlet respectively of hot air conduit section 24, as illustrated in FIG. 3, but cannot be excessively remote from the inlet and outlet respectively or the sensed temperatures will not accurately reflect the temperature of the air entering and exiting hot air conduit section 24.

Figure 4:
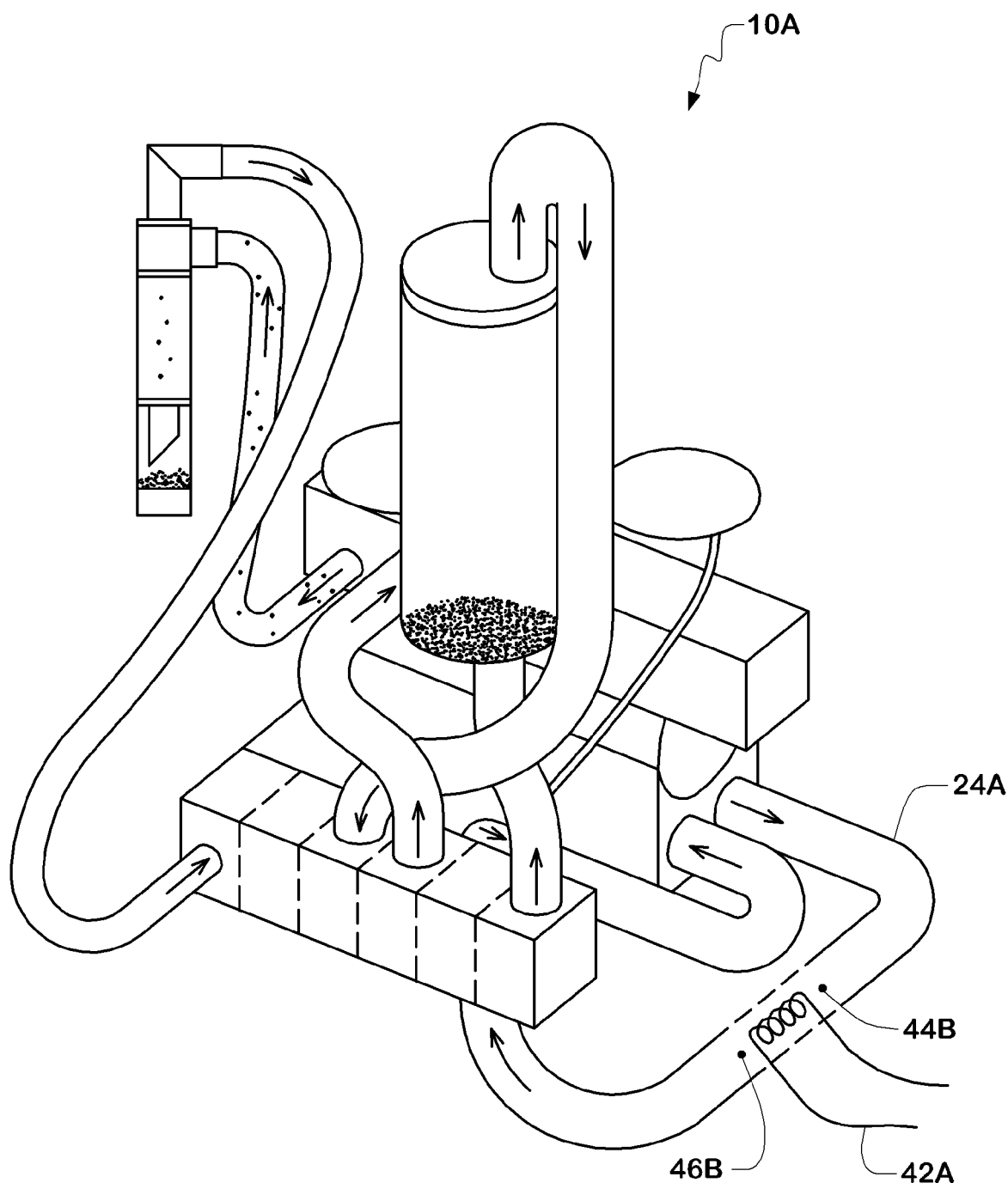
FIG. 4 depicts a portion of a vacuum dryer of the type disclosed in U.S. Pat. No. 7,234,247, modified to embody aspects of the invention.

FIG. 4 illustrates a portion of a vacuum dryer 10A as disclosed in U.S. Pat. No. 7,234,247, the disclosure of which is incorporated herein by reference in its entirety. As schematically depicted in FIG. 4, an electrical resistance heater 42A and temperature sensors 44B, 46B have been illustrated schematically in the interior of the heated air supply conduit 24A and may be utilized in the course of operation of the vacuum dryer to determine the rate of air flow into a canister holding material to be vacuum dried as that material is heated prior to being exposed to vacuum.

In addition to determining air flow rate through a conduit, independently of conduit cross-sectional area, as described above, the method may be used in connection with air drying of granular resin and other granular and powdery materials and facilitates application of a known rate of heated air thereto where the granular and powdery materials are contained in a hopper such as illustrated as 12 in FIG. 1. In such case, the material to be dried is introduced into the closed hopper, having an air inlet receiving heated air from an inlet conduit as illustrated in FIG. 2 or 3, with heated air flow rate into the hopper monitored by measuring temperature of the air at a first position along the inlet conduit, heating the inlet air at a location downstream from the first position by application of known power to the heater to heat the air, measuring the air temperature at a second position along the inlet conduit that is downstream of the heater but upstream of the hopper, subtracting air temperature at the second position from air temperature of the first position to obtain a temperature difference, and thereafter dividing the power applied to the heater to heat the air by the product of the temperature difference and the specific heat of air, to provide air flow rate into the hopper. The method for determining air flow rate may also be used to regulate the dryer responsively to a desired maximum temperature for material that is to be dried in the hopper, responsively to the air temperature measured at the second position, downstream of the heater, or responsively to the rate of heated air furnished to the hopper, or responsively to a combination of these parameters, desirably using a microprocessor such as microprocessor 40 programmed with suitable algorithms.

It is further within the scope of the invention to use microprocessor 50 to control other aspects of the dryer operation, for example operation of the optionally provided auxiliary air dryer 38, to regulate flow of material downwardly and out a discharge outlet 16 of hopper 12 to control flow of additional material to be dried into hopper 12, and to perform other functions with regard to drying and processing of such granular resin or powdery material, in both desiccant-based and vacuum dryers. In that regard, it is within the scope of the invention to measure air flow rates within a conduit such as in conduit 58 at multiple locations within the conduit, for example at positions close to the inlet and outlet of filter 32.

Additionally, it is within the scope of the invention to determine gas flow rates in conduits independently of cross-sectional area of the conduit using the methods and apparatus disclosed herein for gases other than air, so long as those gases may be safely handled and do not ignite at moderate, workable temperatures.

The following is claimed:

1. A method for determining air flow rate through a conduit, independently of conduit cross-sectional area, comprising:
    a. providing a conduit for air flow therethrough, the flow rate of which is to be determined;
    b. measuring temperature of the air at a first position along the conduit;
    c. heating the air in the conduit at a location downstream from the first position by application of a known power level to the air;
    d. measuring air temperature at a second position downstream of the heating position along the conduit;
    e. subtracting air temperature at the second position from air temperature at the first position to obtain a temperature difference;
    f. dividing the power applied to heat the air by the product of the temperature difference and the specific heat of air.

2. The method of claim 1 wherein step "f" is performed by a microprocessor, and further comprising:
    a. visually displaying the result of the division performed in step "f" of claim 1.

3. The method of claim 1 in which the first position is at the conduit inlet.

4. The method of claim 1 in which the first position is upstream of the conduit inlet.

5. The method of claim 1 in which the second position is at the conduit outlet.

6. The method of claim 1 in which the second position is downstream of the conduit outlet.

7. The method of claim 1 in which heating is performed using an electrical resistance heater.

8. The method of claim 6 in which the heater is cycled on and off while air flow rate is being determined.

9. A method for determining air flow rate comprising:
    a. measuring temperature of flowing air at a first position;
    b. heating the flowing air at a location downstream of the first position by application of known power to the air;
    c. measuring temperature of the flowing air at a second position downstream of the heating position;
    d. subtracting air temperature at the second position from air temperature at the first position to obtain a temperature difference;
    e. dividing the power applied to the flowing air by the product of the temperature difference and the specific heat of air.

10. A method for air drying granular resin and other granular and powdery materials with a known rate of application of heated air thereto, comprising:
    a. introducing the material to be dried into a closed hopper having an air inlet receiving heated air from an inlet conduit, with at least one heater positioned to heat air passing through the inlet conduit into the hopper, and having air temperature sensors positioned in the air stream upstream and downstream of the heater, and having an outlet for air to escape from the hopper after having contacted the material therein for heat transfer thereto;
    b. monitoring heated air flow rate into the hopper by:
        i. measuring temperature of the air at a first position along the inlet conduit;
        ii. heating the air in the inlet conduit at a location downstream from the first position by application of a known power to the heater to heat the air;
        iii. measuring air temperature at a second position along the inlet conduit that is downstream of the heater;
        iv. subtracting air temperature at the second position from air temperature at the first position to obtain a temperature difference;
        v. dividing the power applied to the heater to heat the air by the product of the temperature difference and the specific heat of air to provide air flow rate into the hopper.

11. A method for regulating a desiccant-type dryer for granular resin and other granular and powdery materials, comprising:
    a. introducing the material to be dried into a closed hopper having an air inlet receiving heated air from an inlet conduit, with at least one heater positioned to heat air passing through the inlet conduit into the hopper, and having air temperature sensors positioned in the air stream upstream and downstream of the heater, and having an outlet for air to escape from the hopper after having contacted the material therein for heat transfer thereto;
    b. determining heated air flow rate into the hopper by
        i. measuring temperature of the air at a first position along the inlet conduit;
        ii. heating the air in the inlet conduit at a location downstream from the first position by application of a known power to the heater to heat the air;
        iii. measuring air temperature at a second position along the inlet conduit that is downstream of the heater;
        iv. subtracting air temperature at the second position from air temperature at the first position to obtain a temperature difference;
        v. dividing the power applied to the heater to heat the air by the product of the temperature difference and the specific heat of air to provide air flow rate into the hopper; and
    c. regulating heated air flow rate into the hopper responsively to a desired maximum temperature for material in the hopper to be dried and the air temperature measured at the second position.

12. Apparatus for determining air flow rate in a conduit independently of the cross-sectional area of the conduit, comprising:

a. a first temperature sensor for measuring temperature of the air at a first position along the conduit;
b. an electrical resistance heater for heating air in the conduit downstream of the first temperature sensor with a known amount of power;
c. a second temperature sensor for measuring temperature of the air downstream of the heater;
d. a microprocessor for dividing the power applied to heat the air by the product of the temperature difference and the specific heat of air.

13. Apparatus of claim 12 wherein the first temperature sensor is at the inlet to the conduit.

14. Apparatus of claim 12 wherein the first temperature sensor is upstream of the conduit.

15. Apparatus of claim 12 wherein the second temperature sensor is at the outlet from the conduit.

16. Apparatus of claim 12 wherein the second temperature sensor is downstream of the conduit.

17. A desiccant-based dryer for granular and powdery materials, comprising:
    a. a hopper containing the granular or powdery material to be dried;
    b. a conduit for introducing hot air into the hopper for passage through and around the material to be dried, thereby heating the material and evaporating moisture therefrom to affect drying thereof;
    c. an air flow rate measuring device connected to the conduit for measuring the rate of heated air flow into the hopper, comprising:
       i. a first temperature sensor for measuring temperature of the air at a first position along the conduit;
       ii. an electrical resistance heater for heating air in the conduit downstream of the first temperature sensor with a known amount of power;
       iii. a second temperature sensor for measuring temperature of the air downstream of the heater and prior to the connection of the conduit to the hopper; and
    d. a microprocessor for dividing the power applied to heat the air by the product of the temperature difference and the specific heat of air and providing a signal indicative of the rate of heated air flow through the hopper.

18. Apparatus of claim 17 wherein the signal is a visually discernable number in selected units of volume per unit of time.

19. Apparatus for drying granular and powdery materials, comprising:
    a. a hopper containing the granular or powdery material to be dried;
    b. an air filter
    c. an air dryer; and
    d. conduits serially connecting the hopper, the filter and the dryer, for air flow thereamong; and
    e. at least one air flow rate measuring device, each connected to one of the conduits, for measuring the rate of air flow through the conduit to which the device is connected, each device comprising:
       i. a first temperature sensor for measuring temperature of the air at a first position along the conduit;
       ii. a heater for heating air in the conduit downstream of the first temperature sensor with a known amount of power;
       iii. a second temperature sensor for measuring temperature of the air downstream of the heater; and
    f. a microprocessor receiving inputs from all of the temperature sensors and the power furnished to all of the heaters, for dividing the power applied to each heater to heat the air by the product of the temperature difference as measured by the temperature sensors associated with the heater and the specific heat of air and providing visually discernable numerical signals indicative of the rate of air flow through conduit sections associated with given heaters.

20. A method for determining gas flow rate comprising:
    a. measuring temperature of flowing gas at a first position;
    b. heating the flowing gas at a location downstream of the first position by application of known power to the gas;
    c. measuring temperature of the flowing gas at a second position downstream of the heating position;
    d. subtracting temperature at the second position from temperature at the first position to obtain a temperature difference;
    e. dividing the power applied to the flowing gas by the product of the temperature difference and the specific heat of the gas.

21. Apparatus for determining gas flow rate in a conduit independently of the cross-sectional area of the conduit, comprising:
    a. a first temperature sensor for measuring temperature of the gas at a first position along the conduit;
    b. a heater for heating gas in the conduit downstream of the first temperature sensor with a known amount of power;
    c. a second temperature sensor for measuring temperature of the gas downstream of the heater;
    d. a processor for dividing the power applied to heat the gas by the product of the temperature difference and the specific heat of the gas.

22. A vacuum dryer for drying granular and powdery materials, comprising:
    a. a canister for receiving containing the granular or powdery material to be heated to a desired temperature prior to having vacuum drawn thereover;
    b. a conduit for supplying heated air to the canister for raising the temperature of granular or powdery material in the canister to the desired temperature for air flow thereamong; and
    c. at least one air flow rate measuring device, each connected to the conduit, for measuring the rate of air flow through the conduit to which the device is connected, comprising:
       i. a first temperature sensor for measuring temperature of the air at a first position along the conduit;
       ii. a heater for heating air in the conduit downstream of the first temperature sensor with a known amount of power;
       iii. a second temperature sensor for measuring temperature of the air downstream of the heater prior to entry into the canister; and
    d. a microprocessor receiving inputs from the temperature sensors and the power furnished to the heater, for dividing the power applied to the heater to heat the air by the product of the temperature difference as measured by the temperature sensors associated with the heater and the specific heat of air.

23. The vacuum dryer of claim 22 further comprising a video screen for display of visually desirable numbers indicated of the rate of air flow through the conduit section with the numbers being furnished by the microprocessor.

24. A method for regulating a vacuum dryer for granular resin and other granular and powdery materials, comprising:
    a. introducing the material to be dried into a canister portion of the dryer having an air inlet receiving heated air from an inlet conduit, with at least one heater positioned to heat air passing through the inlet conduit into the canister, and having air temperature sensors positioned in the air stream upstream and downstream of the heater, with the downstream sensor being upstream of the air inlet to the canister;
b. determining heated air flow rate into the canister by:
  i. measuring temperature of the air at a first position along the inlet conduit;
  ii. heating the air in the inlet conduit at a location downstream from the first position by application of a known power to the heater to heat the air;
  iii. measuring air temperature at a second position along the inlet conduit that is downstream of the heater but upstream of the air inlet to the canister;
  iv. subtracting air temperature at the second position from air temperature at the first position to obtain a temperature difference;
  v. dividing the power applied to the heater to heat the air by the product of the temperature difference and the specific heat of air to provide air flow rate into the canister; and
c. regulating heated air flow rate into the canister responsively to a desired maximum temperature for material in the canister to be dried and the air temperature measured at the second position; and drawing a vacuum over the material having reached the desired maximum temperature, for sufficient time and at a sufficient level of vacuum to dry the material to a desired level of dryness.

* * * * *